(12) United States Patent
Kornegay et al.

(10) Patent No.: US 12,487,610 B1
(45) Date of Patent: Dec. 2, 2025

(54) UNMANNED VEHICLE SAFETY ASSURANCE SYSTEM

(71) Applicant: Morgan State University, Baltimore, MD (US)

(72) Inventors: Kevin Kornegay, Middle River, MD (US); Denzel Hamilton, Upper Marlboro, MD (US)

(73) Assignee: Morgan State University, Baltimore, MD (US)

( * ) Notice: Subject to any disclaimer, the term of this patent is extended or adjusted under 35 U.S.C. 154(b) by 134 days.

(21) Appl. No.: 18/640,354

(22) Filed: Apr. 19, 2024

Related U.S. Application Data

(60) Provisional application No. 63/460,355, filed on Apr. 19, 2023.

(51) Int. Cl.
  *G05D 1/617* (2024.01)
  *G05D 1/248* (2024.01)
  *H04W 4/44* (2018.01)
  *G05D 101/15* (2024.01)
  *G05D 109/20* (2024.01)
  *G05D 111/10* (2024.01)
  *G05D 111/30* (2024.01)

(52) U.S. Cl.
  CPC ............ *G05D 1/617* (2024.01); *G05D 1/248* (2024.01); *H04W 4/44* (2018.02); *G05D 2101/15* (2024.01); *G05D 2109/20* (2024.01); *G05D 2111/17* (2024.01); *G05D 2111/32* (2024.01)

(58) Field of Classification Search
  CPC .... G05D 1/617; G05D 1/248; G05D 2101/15; G05D 2109/20; G05D 2111/17; G05D 2111/32; H04W 4/44
  See application file for complete search history.

(56) References Cited

U.S. PATENT DOCUMENTS

2022/0388543 A1* 12/2022 David ............. B60W 30/18163

* cited by examiner

*Primary Examiner* — Yuen Wong
(74) *Attorney, Agent, or Firm* — Whiteford, Taylor & Preston, LLP; Peter J. Davis

(57) ABSTRACT

A safety assurance system and apparatus for improving the safety of unmanned vehicles where various computer, GPS and proximity data is collected onboard from the unmanned vehicle and transmitted to a ground/home station, where the data is assigned values according to fuzzy logic rules. The values are input to a fuzzy logic safety module and three different fuzzy logic security modules to safety and risk scores. The safety and risk scores are then applied to a decision tree to determine whether the native navigation control system should be confirmed to continue mission or overridden to hover/idle in place, land in place or return to home.

2 Claims, 17 Drawing Sheets

```
Decision tree for classification
  1  if x4<0.45 then node 2 elseif x4>=0.45 then node 3 else 1
  2  if x2<0.60035 then node 4 elseif x2>=0.60035 then node 5 else 1
  3  class = 3
  4  if x1<0.60305 then node 6 elseif x1>=0.60305 then node 7 else 1
  5  if x1<0.6504 then node 8 elseif x1>=0.6504 then node 9 else 4
  6  if x2<0.15895 then node 10 elseif x2>=0.15895 then node 11 else 1
  7  if x1<0.65005 then node 12 elseif x1>=0.65005 then node 13 else 2
  8  if x1<0.6136 then node 14 elseif x1>=0.6136 then node 15 else 4
  9  class = 2
 10  if x1<0.60295 then node 16 elseif x1>=0.60295 then node 17 else 1
 11  if x1<0.5872 then node 18 elseif x1>=0.5872 then node 19 else 2
 12  if x2<0.14995 then node 20 elseif x2>=0.14995 then node 21 else 2
 13  class = 2
 14  if x1<0.6004 then node 22 elseif x1>=0.6004 then node 23 else 4
 15  if x2<0.64255 then node 24 elseif x2>=0.64255 then node 25 else 4
 16  if x1<0.60055 then node 26 elseif x1>=0.60055 then node 27 else 1
 17  class = 1
 18  class = 4
 19  class = 2
 20  if x3<0.29855 then node 28 elseif x3>=0.29855 then node 29 else 1
 21  class = 2
 22  class = 4
 23  if x1<0.60095 then node 30 elseif x1>=0.60095 then node 31 else 4
 24  if x1<0.6445 then node 32 elseif x1>=0.6445 then node 33 else 2
 25  class = 4
 26  class = 1
 27  if x2<0.1363 then node 34 elseif x2>=0.1363 then node 35 else 1
 28  if x4<0.16155 then node 36 elseif x4>=0.16155 then node 37 else 1
```

Figure 22A

```
29  class = 2
30  class = 2
31  if x2<0.648 then node 38 elseif x2>=0.648 then node 39 else 4
32  if x1<0.6412 then node 40 elseif x1>=0.6412 then node 41 else 2
33  class = 4
34  class = 1
35  class = 2
36  if x3<0.10865 then node 42 elseif x3>=0.10865 then node 43 else 1
37  class = 2
38  if x4<0.02835 then node 44 elseif x4>=0.02835 then node 45 else 4
39  class = 4
40  if x2<0.63305 then node 46 elseif x2>=0.63305 then node 47 else 2
41  class = 2
42  if x3<0.10415 then node 48 elseif x3>=0.10415 then node 49 else 1
43  if x1<0.6038 then node 50 elseif x1>=0.6038 then node 51 else 1
44  class = 2
45  class = 4
46  if x2<0.6239 then node 52 elseif x2>=0.6239 then node 53 else 4
47  class = 2
48  if x2<0.0163 then node 54 elseif x2>=0.0163 then node 55 else 1
49  class = 2
50  class = 2
51  if x1<0.6497 then node 56 elseif x1>=0.6497 then node 57 else 1
52  if x1<0.6311 then node 58 elseif x1>=0.6311 then node 59 else 2
53  class = 4
54  if x4<0.0888 then node 60 elseif x4>=0.0888 then node 61 else 1
55  if x3<0.0784 then node 62 elseif x3>=0.0784 then node 63 else 1
56  if x3<0.2362 then node 64 elseif x3>=0.2362 then node 65 else 1
57  class = 2
58  if x2<0.6053 then node 66 elseif x2>=0.6053 then node 67 else 2
```

Figure 22B

```
59  class = 4
60  class = 1
61  class = 2
62  if x4<0.1374 then node 68 elseif x4>=0.1374 then node 69 else 1
63  if x2<0.1108 then node 70 elseif x2>=0.1108 then node 71 else 1
64  if x3<0.18515 then node 72 elseif x3>=0.18515 then node 73 else 1
65  if x3<0.23855 then node 74 elseif x3>=0.23855 then node 75 else 1
66  class = 4
67  class = 2
68  if x4<0.0653 then node 76 elseif x4>=0.0653 then node 77 else 1
69  class = 1
70  if x3<0.0921 then node 78 elseif x3>=0.0921 then node 79 else 1
71  class = 2
72  if x3<0.1844 then node 80 elseif x3>=0.1844 then node 81 else 1
73  class = 1
74  class = 2
75  if x1<0.63825 then node 82 elseif x1>=0.63825 then node 83 else 1
76  if x4<0.0586 then node 84 elseif x4>=0.0586 then node 85 else 1
77  class = 1
78  class = 2
79  if x4<0.01785 then node 86 elseif x4>=0.01785 then node 87 else 1
80  if x4<0.0725 then node 88 elseif x4>=0.0725 then node 89 else 1
81  class = 2
82  if x2<0.0251 then node 90 elseif x2>=0.0251 then node 91 else 1
83  if x1<0.6442 then node 92 elseif x1>=0.6442 then node 93 else 1
84  class = 1
85  class = 2
86  class = 2
87  class = 1
88  class = 1
```

Figure 22C

```
89   if x4<0.07345 then node 94 elseif x4>=0.07345 then node 95 else 1
90   if x2<0.0224 then node 96 elseif x2>=0.0224 then node 97 else 1
91   class = 1
92   class = 2
93   class = 1
94   class = 2
95   if x1<0.63635 then node 98 elseif x1>=0.63635 then node 99 else 1
96   class = 1
97   class = 2
98   class = 1
99   if x3<0.14155 then node 100 elseif x3>=0.14155 then node 101 else 1
100  class = 1
101  class = 2
```

Figure 22D

UNMANNED VEHICLE SAFETY ASSURANCE SYSTEM

FIELD OF THE INVENTION

This invention relates to systems for the safe operation of unmanned vehicles.

BACKGROUND OF THE INVENTION

U.S. Pat. No. 10,586,462 describes methods for safe operation of unmanned aerial vehicles using a virtual radar system. U.S. Pat. No. 11,195,057 describes a system and method for pattern recognition and an artificial intelligence (AI) platform for various uses including drone navigation.

SUMMARY OF THE INVENTION

The present invention includes a safety assurance system for unmanned vehicles. For the purposes of this invention, the term unmanned vehicle(s) ("UV") includes unmanned aerial vehicles ("UAVs"), unmanned ground/land vehicles, unmanned surface water vehicles and unmanned underwater vehicles. Accordingly there is presented according to the invention an unmanned vehicle system including an unmanned vehicle, a ground/home station and a controller, the UV having battery, a UV processor, a UV non-transient computer memory, a UV wireless transmitter, a UV wireless receiver, and a sensor payload comprising a plurality of navigation sensors and a plurality of security sensors including a GPS and a LIDAR, the ground/home station comprising a wireless transmitter, a wireless receiver, a processor and non-transient computer memory, the controller having a wireless transmitter, a wireless receiver, a processor, and a non-transient computer memory. The UV memory contains computer readable instructions, which when executed by said UV processor cause the UV processor to: control said UV based on navigation instructions received at said UV wireless receiver from said controller wireless transmitter, collect sensor data from said plurality of navigation sensors and said plurality of security sensors to collect sensor data, and transmit said sensor data via said UV wireless transmitter to said ground/home station wireless receiver. The ground/home station processor and ground/home station non-transient computer memory includes navigation software configured for navigation control of said UV; a fuzzy logic safety module configured to calculate a safety risk score based on direction of travel of the UV and proximity sensor inputs, a first fuzzy logic security module configured to calculate a connection risk score using router access, ports, services, and link inputs, a second fuzzy logic security module configured to calculate a payload stress risk score using CPU, memory and processes inputs, a third fuzzy logic security module configured to calculate a drone risk score using battery, GPS, sensor, file system, and installed packages inputs, and a decision tree module configured to calculate a navigation contingency based on said safety risk score, said connection risk score, said payload stress risk score, and said drone risk score, wherein said navigation contingency is selected from continue mission, hover/idle in place, land in place, and return to home.

The present invention also includes a computer implemented method for improving the safety of an unmanned vehicle, including the steps collecting and storing, CPU, memory processes, router access, ports, services, link, battery, file system, and installed packages data from an UV onboard computer, collecting and storing GPS data from an onboard GPS and proximity data from an onboard LIDAR, transmitting the collected data to a ground/home station; using fuzzy logic rules to assign values to said data; using fuzzy logic rules to generate a safety risk score based on a direction of travel of said UV and a proximity data value, using fuzzy logic rules to generate a connection risk score from values assigned to said router access, ports, services and link data, using fuzzy logic rules to generate a payload stress risk score from values assigned to said CPU, memory and processes data, using fuzzy logic rules to generate a drone risk score from values assigned to said battery, GPS, sensor, file system and installed packages data, using a decision tree to arrive at one of a continue mission determination, a hover/idle in place determination, a land in place determination and a return to home determination, and confirming or overriding UV control commands based on said decision tree determination.

BRIEF DESCRIPTION OF DRAWINGS

FIG. 22A is an example of a flight contingency decision tree according to an embodiment of the invention.

FIG. 22B is a continuation of FIG. 22A.

FIG. 22C is a continuation of FIG. 22B.

FIG. 22D is a continuation of FIG. 22C.

DETAILED DESCRIPTION OF THE INVENTION

For the purposes of explanation, the remainder of this application will detail the invention using an example of an unmanned aerial vehicle ("UAV"). However, as noted above, this invention is intended for use in connection with any type of unmanned vehicle. Accordingly, this description is not intended to, and should not be, construed to limit the invention to unmanned aerial vehicles.

In a first aspect of this invention, fuzzy inference systems are used to calculate security and navigation risk scores (output) for an operating UAV based on input from various security and navigation sensors on the UAV using fuzzy logic. The fuzzy rules estimate flight-plan risk outputs based on current mission data input. In a second aspect of this invention, the security and navigation risk scores are fed to a decision tree to determine a recommended course of action for the UAV, for example, continue mission, hover, land, or return to home.

Figure 1:
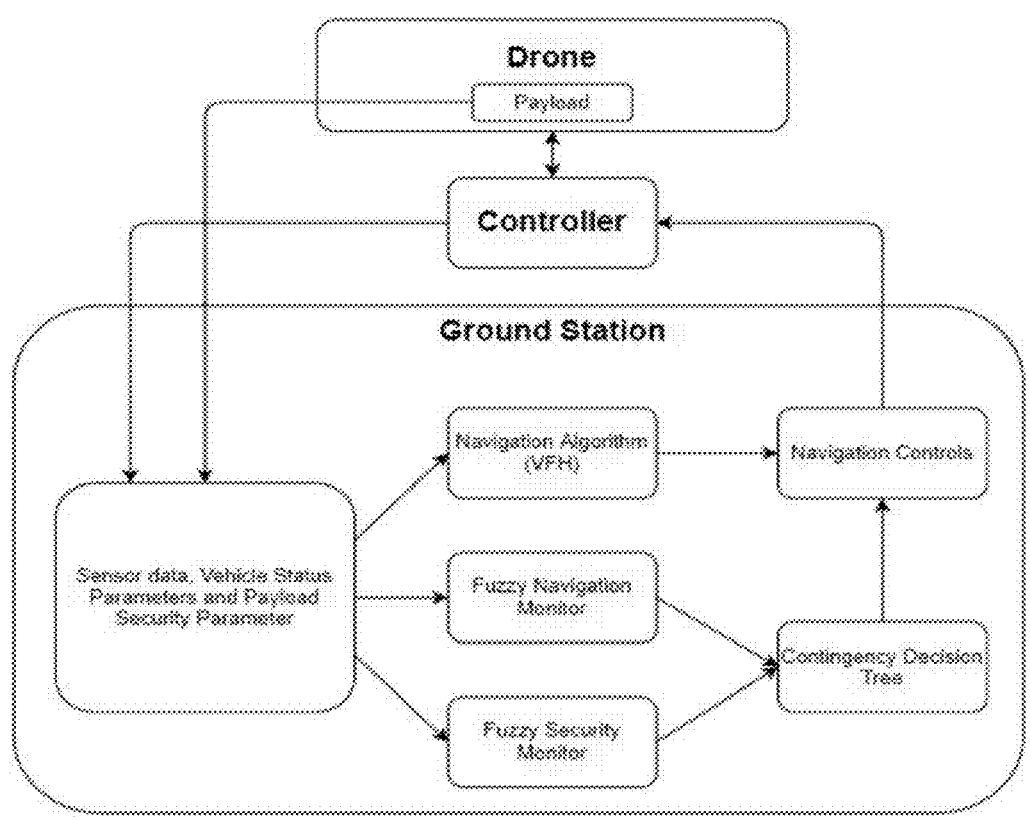
FIG. 1 is a diagram of a system according to an embodiment of the invention.

According to various embodiments of the invention, an unmanned aerial vehicle includes a sensor payload and a transmitter/receiver that communicates with a ground station. The ground station receives sensor and payload data and creates status parameters. The status parameters are used to calculate security and navigation risk scores using fuzzy logic inference systems. The risk scores are input to a decision tree to predict the best action for the UAV to take based on the risk scores. A diagram of an exemplary system according to an embodiment is shown in FIG. 1. This invention is particularly suited for various real-world applications such as package delivery, agriculture, surveillance, search and rescue, government applications, military, etc.

For experiments that were used to develop this invention, the following equipment/hardware and software was used:
- 3DR Solo drone w/OpenSolo 4 firmware
- 3DR Solo controller
- Payload:
  - Raspberry Pi 4 onboard computer
  - LDS-01 360 2D Laser Distance Sensor ("LIDAR")
  - GPS
  - Battery pack
- Ground Station Server (Windows 10 computer)
- Python w/Dronekit library
- Matlab w/ROS toolbox The 3dr Solo and controller (3D Robotics) uses the mavlink protocol to send and receive data and uses open-source code to operate. The Dronekit library in Python uses the mavlink protocol to send instructions to a UAV using easy to understand functions. Matlab is used for creating fuzzy members from sensor and payload data. It also has many libraries, including the Robot Operating System (ROS), which may be used for retrieving LIDAR data from the payload. Notwithstanding the exemplary and non-limiting examples described herein, any equipment/hardware and software capable of carrying out the functions described herein may be used to practice the invention, provided that the coding environment has enough versatility to bring in libraries for different applications such as UAV control and communication.

The invention is preferably activated immediately when the UAV embarks on a mission according to a flight plan. The payload sensors on the UAV collect and send to the ground station various flight and operational data, e.g., sensor data, vehicle status parameters, and payload security parameters. GPS data is sent for processing to the navigation collision algorithm (as would be the case in any standard UAV operation) for output for use as feedback to the Navigation Control software.

A fuzzy navigation safety module uses fuzzy logic to output a navigation safety risk score using inputs derived from LIDAR sensor data, see Table 1.

TABLE 1

Fuzzy safety monitor inputs/outputs.

| Members | Input/Output | Ranges |
| --- | --- | --- |
| Near Acceptable Region | Input | 0-1 |
| Far Surrounded | Input | 0-1 |
| Safety Risk Score | Output | 0-1 |

Figure 2:
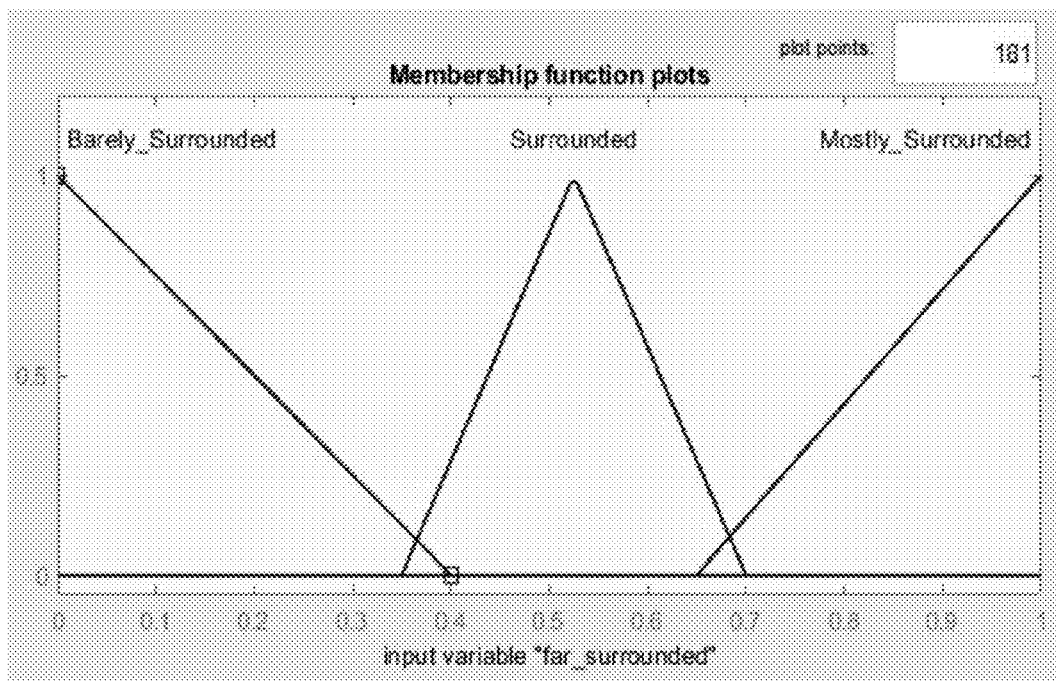
FIG. 2 is a plot of the far surrounded membership function according to an embodiment of the invention.

The "Far Surrounded Region" member represents a percentage of a 360-value LIDAR scan that comes within a predetermined threshold. The threshold can be set to any suitable distance based on the UAV size and desired sensitivity. The percentages of degrees whose distance is less than the threshold is the Far Surrounded parameter. Other ranges, e.g., "barely surrounded", "surrounded", and "mostly surrounded" are classified based on the ability of the UAV to continue flight using the native collision avoidance algorithm of the Navigation Control software. The Far Surrounded membership graph is shown in FIG. 2.

Figure 3:
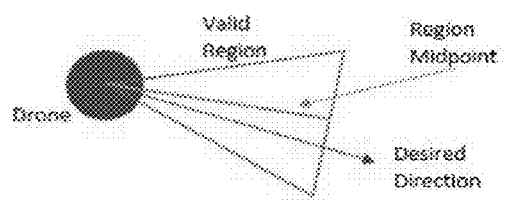
FIG. 3 is a Diagram of the Acceptable Region Calculation according to an embodiment of the invention.

The "Near Acceptable Region" member represents closeness to an acceptable region (see the calculation for acceptable region in FIG. 3). Regions of degrees in the LIDAR scan are determined based on distance checks in adjacent degrees. The threshold used for this metric can likewise be set to any suitable distance based on UAV size and desired sensitivity.

Figure 4:
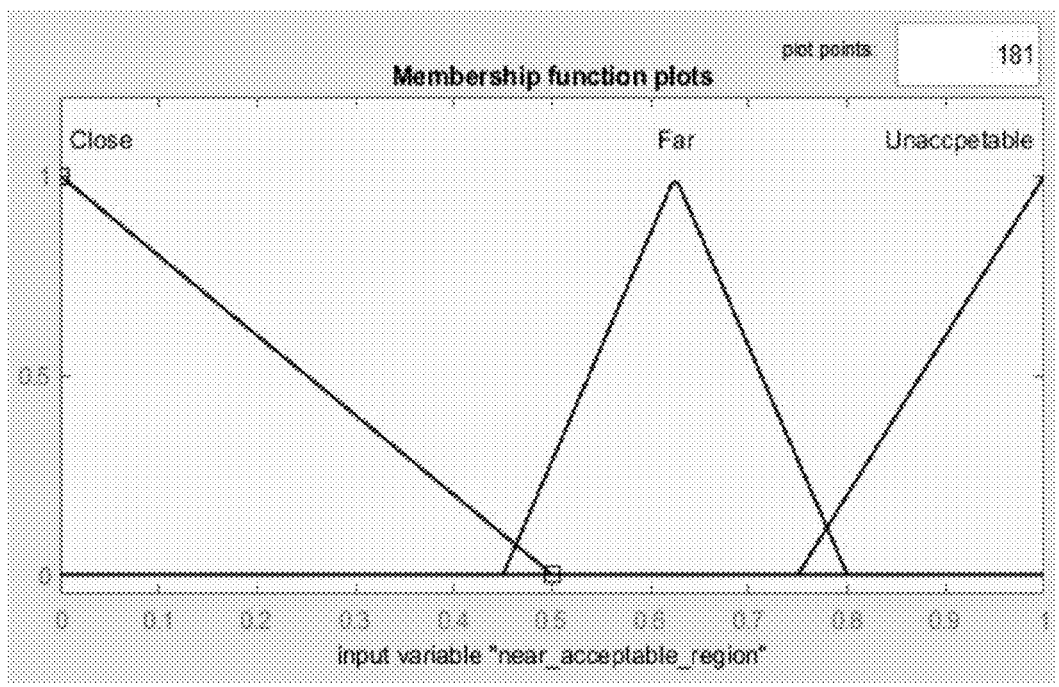
FIG. 4 is a plot of the near acceptable membership function according to an embodiment of the invention.

Once the Far Surrounded and Near Acceptable regions are determined, the midpoints of the regions are considered the best directions to navigate for avoiding collisions. The desired direction based on the UAV's native navigation system is checked to see if it falls in a near acceptable region. If not, the acceptable region parameter is set to 1. If so, the near acceptable region is the percentage of degrees away from the midpoint. The close range is preferably set from 0 to 0.5 because that means the desired direction is still closer to the region midpoint than the boundary of the region. The far range may be set to 0.45 to 0.8 because the desired direction of the UAV can still be traversed depending on the size of the UAV. The Near Acceptable region member graph is shown in FIG. 4.

Figure 5:
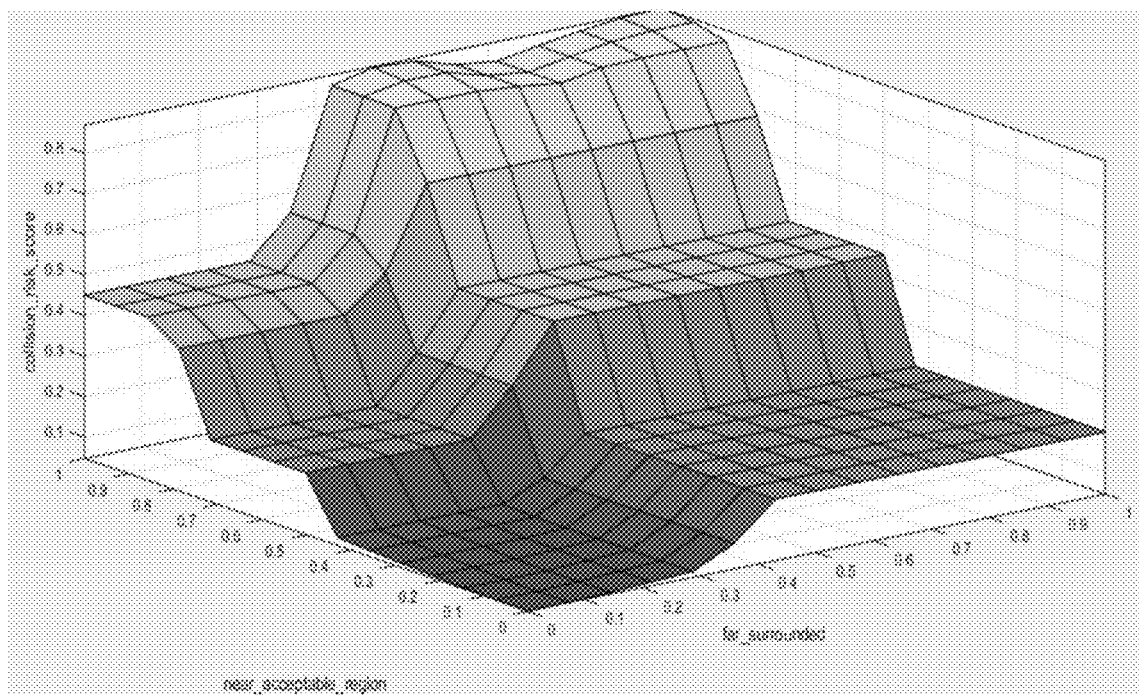
FIG. 5 is a graph representing a navigation safety risk rule according to an embodiment of the invention.

The navigation safety risk score output by the fuzzy navigation safety module represents the chance of failure based on the desired direction of travel while also considering the full proximity of the UAV. The closer the Near Acceptable region is to zero, the lower the safety risk. Meanwhile, the lower the Far Surrounded percentage, the lower the safety risk as well. A graph of the safety risk score outputs vs Near Acceptable percentage vs Far Surrounded percentage is shown in FIG. 5.

In addition to the navigation safety risk module/score, the invention includes three fuzzy security modules to produce security scores, a fuzzy connection risk module, a fuzzy payload risk module and a fuzzy drone risk module. The member inputs for the fuzzy risk modules are shown in Table 2.

TABLE 2

Fuzzy Security Monitor Inputs/Outputs

| Members | Input/Output | Ranges |
| --- | --- | --- |
| Router Access | Input | 0 or 1 |
| Processes | Input | 0-3 |
| Installed Packages | Input | 0-1 |
| Link | Input | 0 or 1 |
| Services | Input | 0-1 |
| Ports | Input | 0-1 |
| Filesystem | Input | 0 or 1 |
| CPU | Input | 0-2 |
| Memory | Input | 0-2 |
| Sensor | Input | 0-1 |
| GPS | Input | 0 or 1 |
| Battery | Input | 0-1 |
| Connection Risk | Output | 0-1 |
| Payload Stress Risk | Output | 0-1 |
| Drone Risk | Output | 0-1 |

Figure 6:
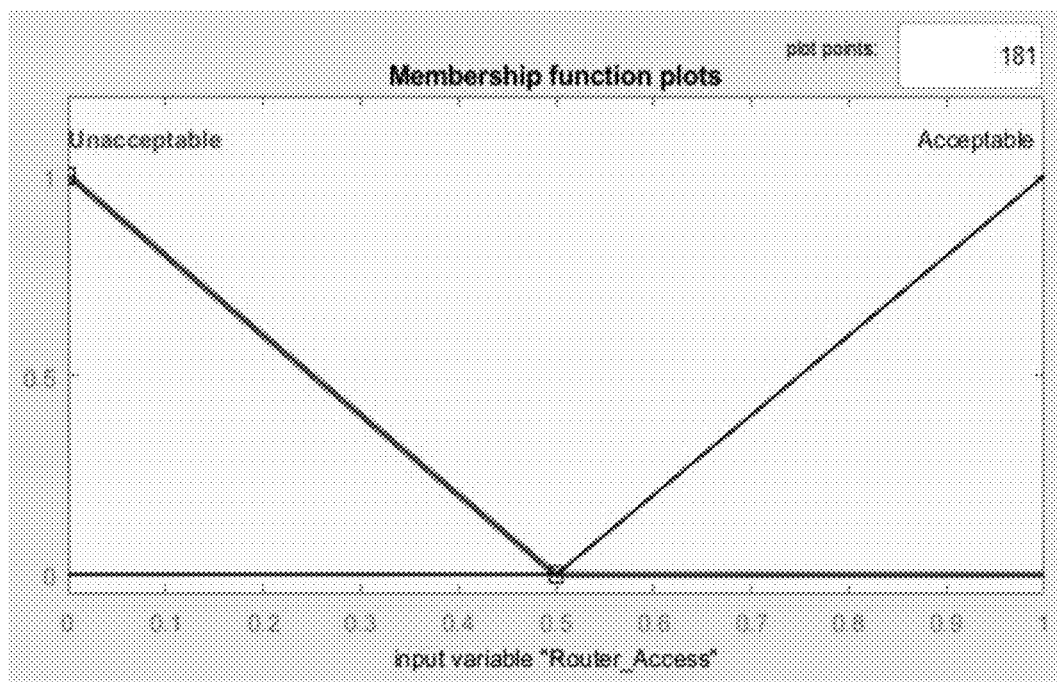
FIG. 6 is a plot of the router access membership function according to an embodiment of the invention.

The router access member represents the integrity of the flight controller. The IP addresses of the known devices connected to the controller are stored as acceptable devices. The found IP addresses on the network are compared to the list of acceptable device IPs to verify the integrity of the flight controller. The router access value is binary, so 1 is acceptable (no unexpected/rogue devices have connected to the network) and 0 is unacceptable. All expected IP addresses should be found on the status log or else the router access value is set to 0. Since the router access member is binary, the membership functions only represent the extremes. The router access membership graph is shown in FIG. 6.

Figure 7:
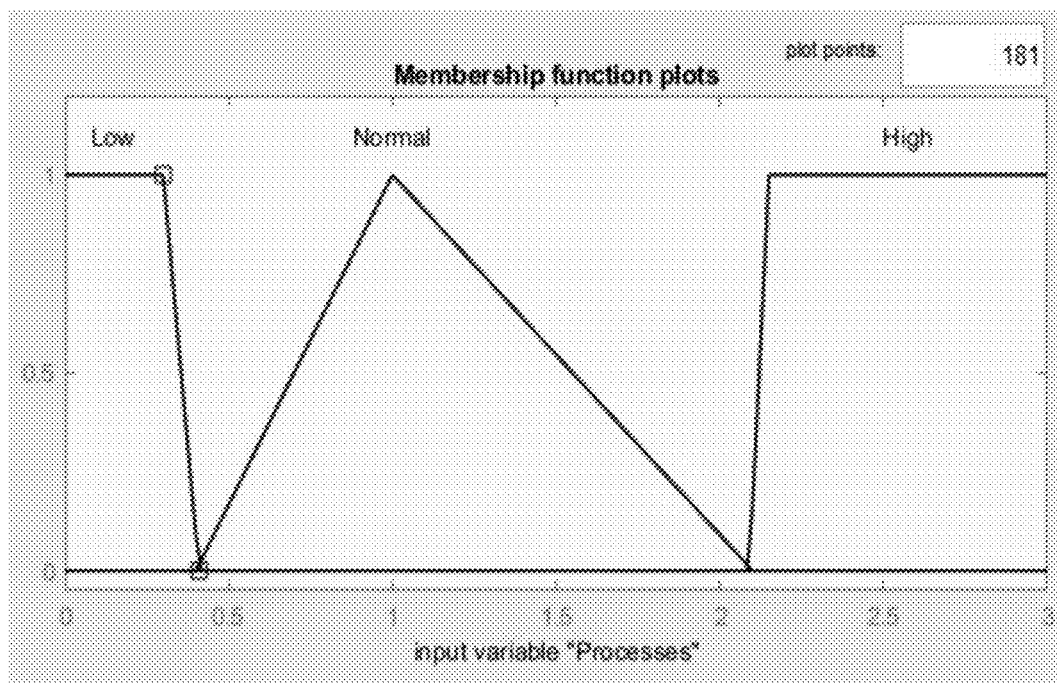
FIG. 7 is a plot of the processes membership function according to an embodiment of the invention.

The processes member is an anomaly detection metric corresponding to the number of running processes on the sensor payload. A nominal value is found by recording the number running process every couple of seconds during normal operation and calculating the average. Data is collected over days to account for unpredictable background tasks that occur on the system. Following data collection, the average number of running processes may be determined for the sensor payload. The normal range may be set to account for instantaneous fluctuation in the running processes due to unpredictable background tasks. The lower bound is preferably set to 0 because there cannot be a negative number of running processes. The upper bound is preferably set to no more than a 200 percent increase in the running processes at any time. During flight, the ground station retrieves the running process status from the sensor payload and divides the value by the nominal value to produce a percent change from the nominal state. The process member graph is shown in FIG. 7.

Figure 8:
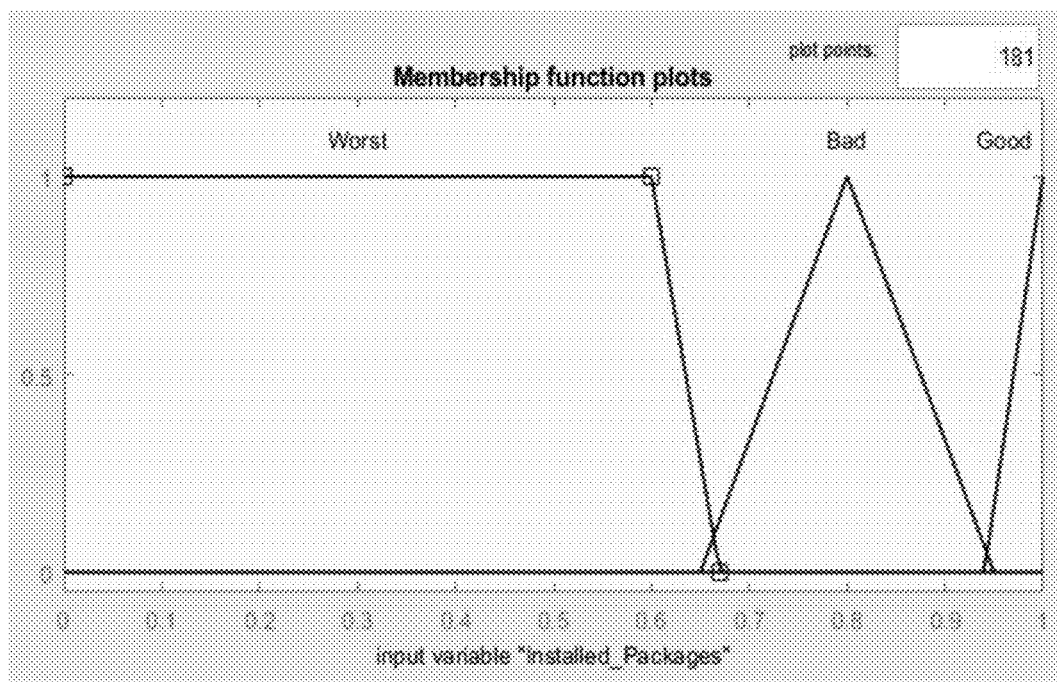
FIG. 8 is a plot of the installed packages membership function according to an embodiment of the invention.

The installed packages member is an anomaly detection metric for the installation of programs and packages. Once the sensor payload of the operating system is verified as safe, the list of installed packages is logged. The log file is then hashed for a verification check. The logging process is done 10 times to account for timing constraints in crontabs and achieve a closer to real-time detection of installations. The 10 hashes are logged one-by-one in a separate status file that the ground station retrieves. The ground station has the correct hash pre-loaded for verification. The installed packages value is the percent of correct verifications. The installed package member graph is shown in FIG. 8.

Figure 9:
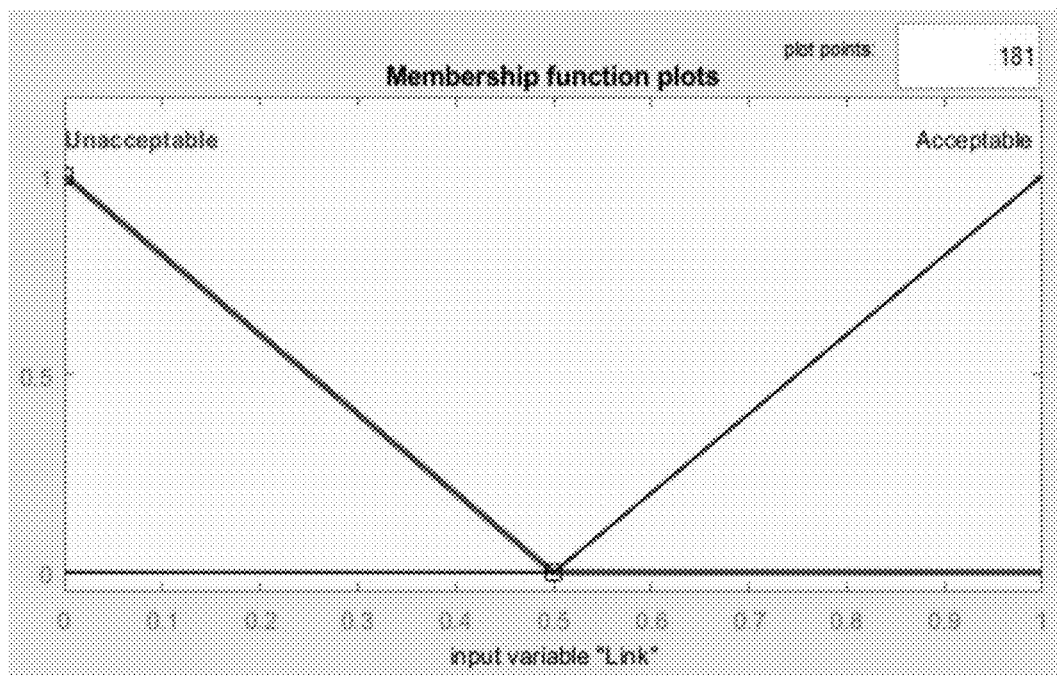
FIG. 9 is a plot of the link membership function according to an embodiment of the invention.

The link member represents the connection between the sensor payload and the ground station. The ground station depends on a ssh connection to retrieve security status files or else the security monitor does update statuses. The link member is a binary value, so 1 is a successful retrieval of the security status files (acceptable) and 0 is failure to acquire files (unacceptable), depending on timing issues with reading and overwriting status files. When the link parameter is 0 it will trigger a false positive increase in connection risk. An incremental check on status parameters is implemented to make sure quick toggles do ultimately trigger physical responses/contingencies. The link member graph is shown in FIG. 9.

Figure 10:
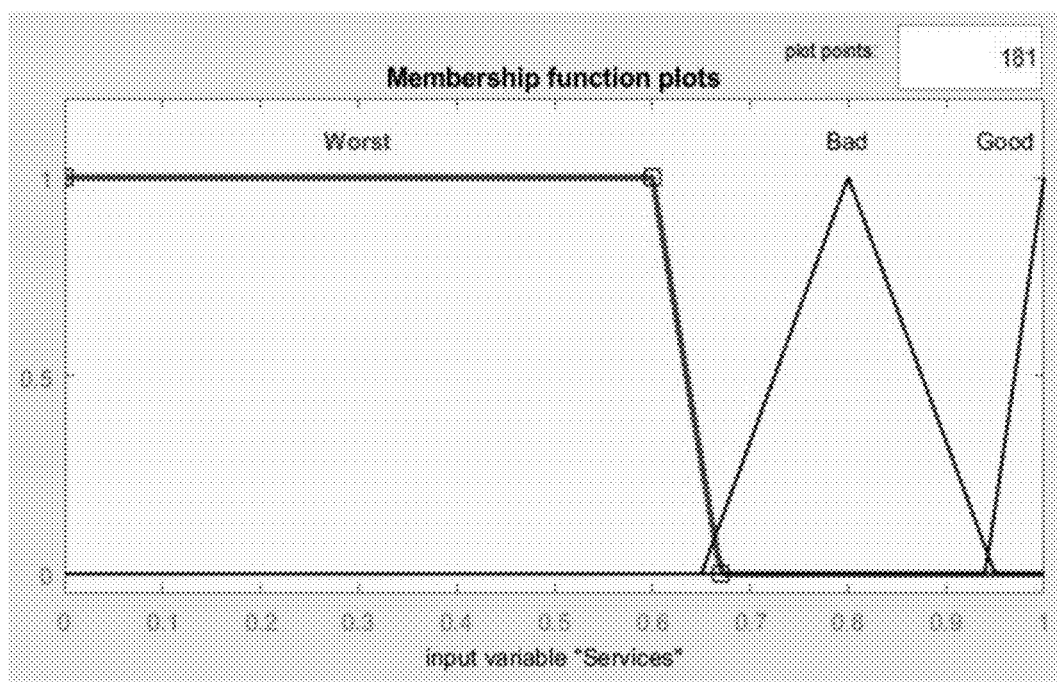
FIG. 10 is a plot of the services membership function according to an embodiment of the invention.

The services member is an anomaly detection metric for active services. Once the sensor payload operating system is verified as safe and all necessary services are active, the list of active services is logged. Similarly, to the installed packages member, the log file is hashed, and the hashes are compared to pre-loaded hashes on the ground station. According to preferred embodiments, ten (10) verifications are performed and the services value is the percentage of correct verifications, and the value can vary from 0 to 1 in increments of 0.1. If the services status changes, the hash of the status log will change, causing the services value to increase or decrease, depending on the timing of the detection. The services member graph is shown in FIG. 10.

Figure 11:
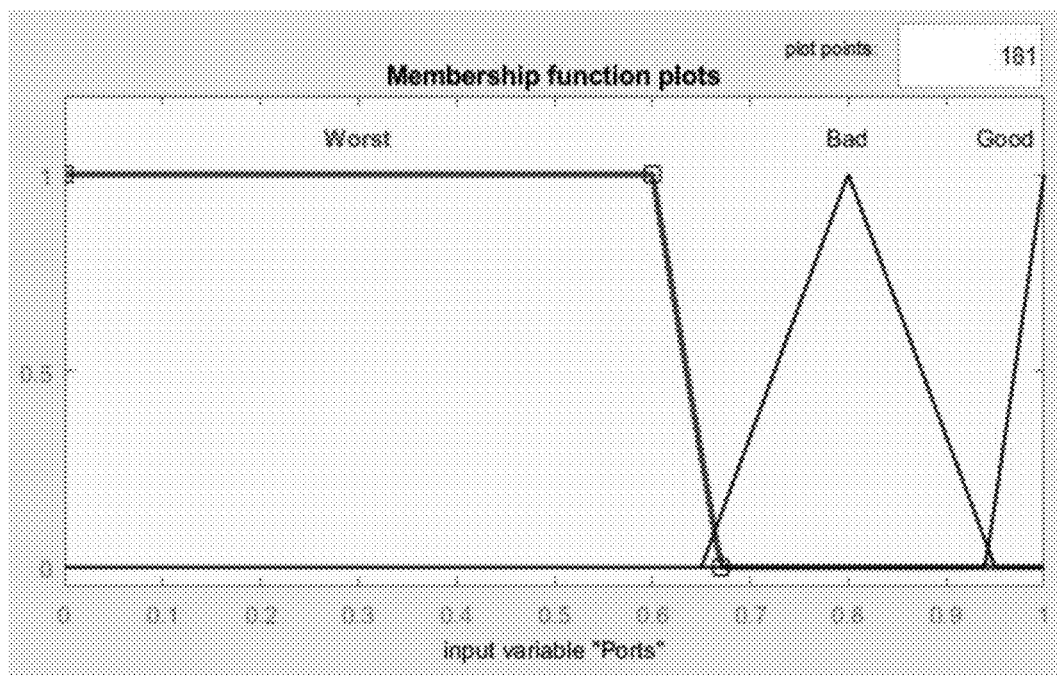
FIG. 11 is a plot of the ports membership function according to an embodiment of the invention.

The ports member is an anomaly detection metric for listening ports. Once the sensor payload operating system is verified as safe and all necessary ports are listening, the list of listening ports is logged. Similarly, to the installed packages and service members, the log file is hashed, and the hashes are compared to pre-loaded hashes on the ground station. According to preferred embodiments, ten (10) verifications are performed and the ports value is the percentage of correct verifications, and the value can vary from 0 to 1 in increments of 0.1. If the ports status changes, the hash of the status log will change, causing the ports value to increase or decrease, depending on the timing of the detection. The ports member graph is shown in FIG. 11.

Figure 12:
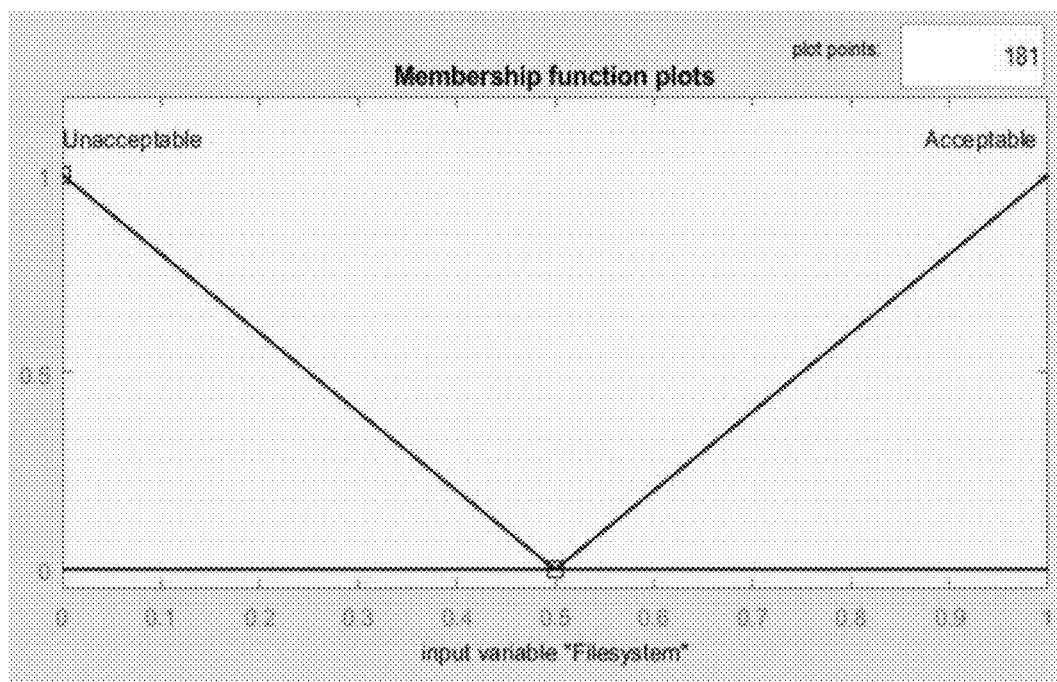
FIG. 12 is a plot of the file system membership function according to an embodiment of the invention.

The files system member represents the integrity of the user space in the sensor payload. The assumption is that an adversary needs time to elevate to administrative or root privilege but might have access to the user space. All filenames in the user space are recorded to a status file. The status file is retrieved by the ground station and verifies that all currently present files are allowed. Since hashing all files would take too long for reliable real-time detection, the contents of the files need not be checked. The other metrics such as router access, ports, processes and CPU supplement the detection capability of the file system metric. The file system member is a binary value, so 1 means no new files were added and 0 means files were added. A value of 1 for filesystem is desired for the drone payload to be considered uncompromised. If an experienced hacker attacks the system, he/she would need to move quickly and bring their own tools. The quick updates of the filesystem status log can result in detection of quick cyber threats. The files system member graph is shown in FIG. 12.

Figure 13:
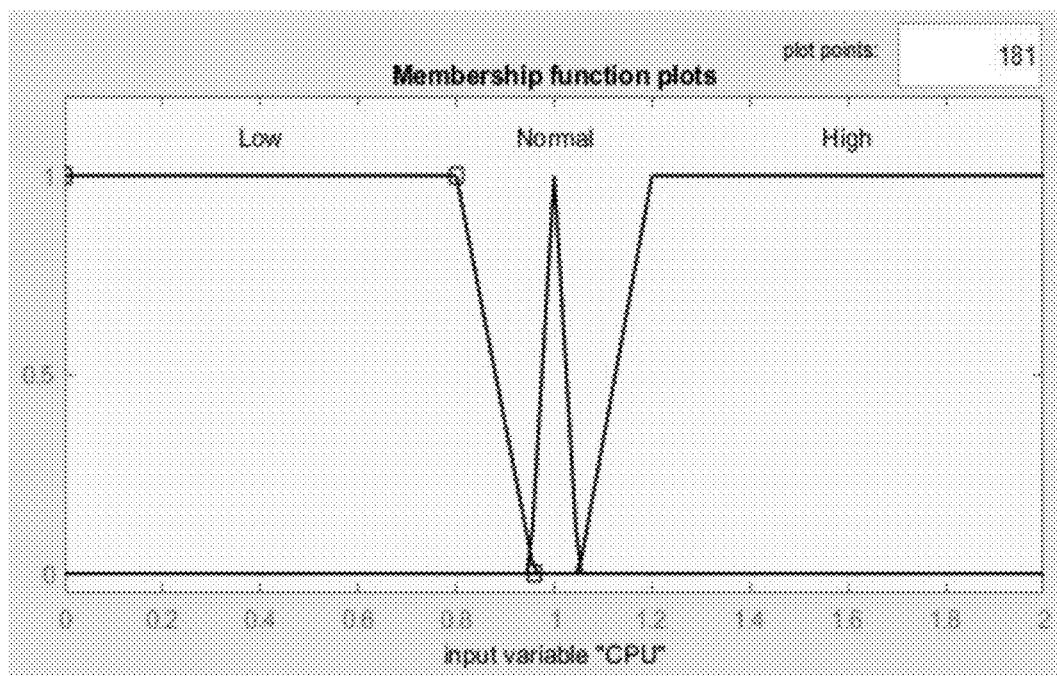
FIG. 13 is a plot of the CPU membership function according to an embodiment of the invention.

The CPU member is an anomaly detection metric for the percent of CPU usage. Similarly, to the processes member, a nominal value is found by recording the percent of CPU usage every few seconds during normal operation and calculating the average. Data is collected over a matter of days to account for unpredictable background tasks that occur on the operating system. The average percent CPU usage is calculated. The ground station retrieves the CPU status from the sensor payload and divides the value by the nominal value to produce a percent change from the nominal state. The normal range is preferably set to 0.95 to 1.05 based on the slight fluctuation of CPU usage during flight. The CPU usage does occasionally leave the normal range but the payload stress fuzzy inference system accounts for that through lowered sensitivity of the CPU metric. The CPU member graph is shown in FIG. 13.

Figure 14:
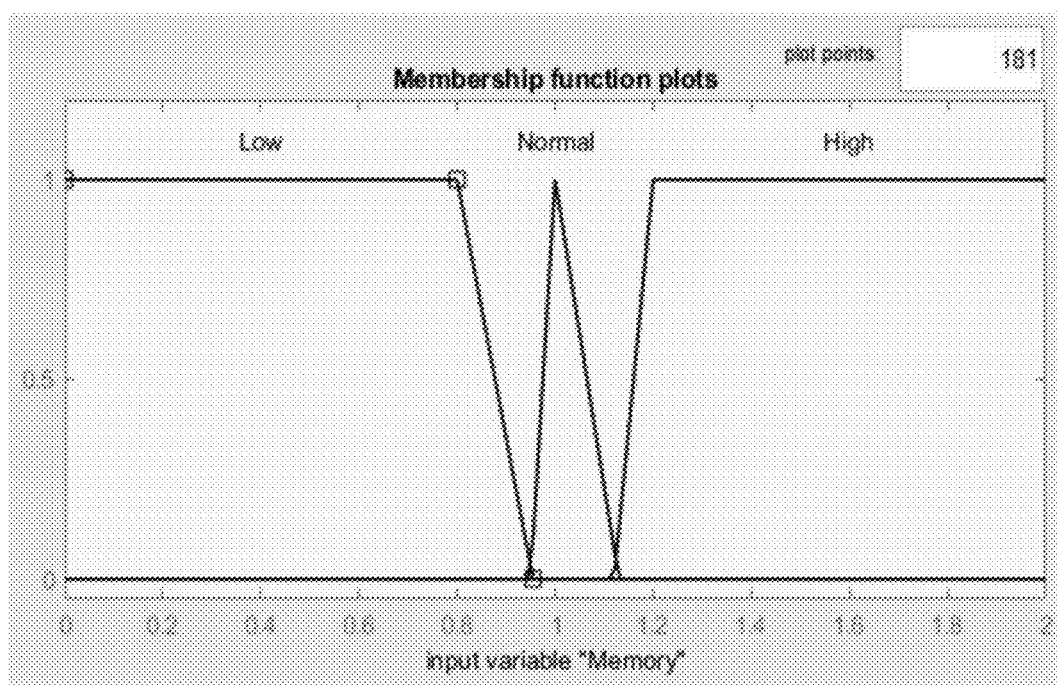
FIG. 14 is a plot of the memory membership function according to an embodiment of the invention.

The memory member is an anomaly detection metric for system memory usage. Similarly, to the processes and CPU members, a nominal value is found by recording the memory usage every couple of seconds during normal operation and calculating the average. Data is collected over a matter of days to account for unpredictable background tasks that occur on the operating systems. The normal range is set to 0.95 to 1.13 based on the fluctuation of memory usage during flight. The memory member graph is shown in FIG. 14.

Figure 15:
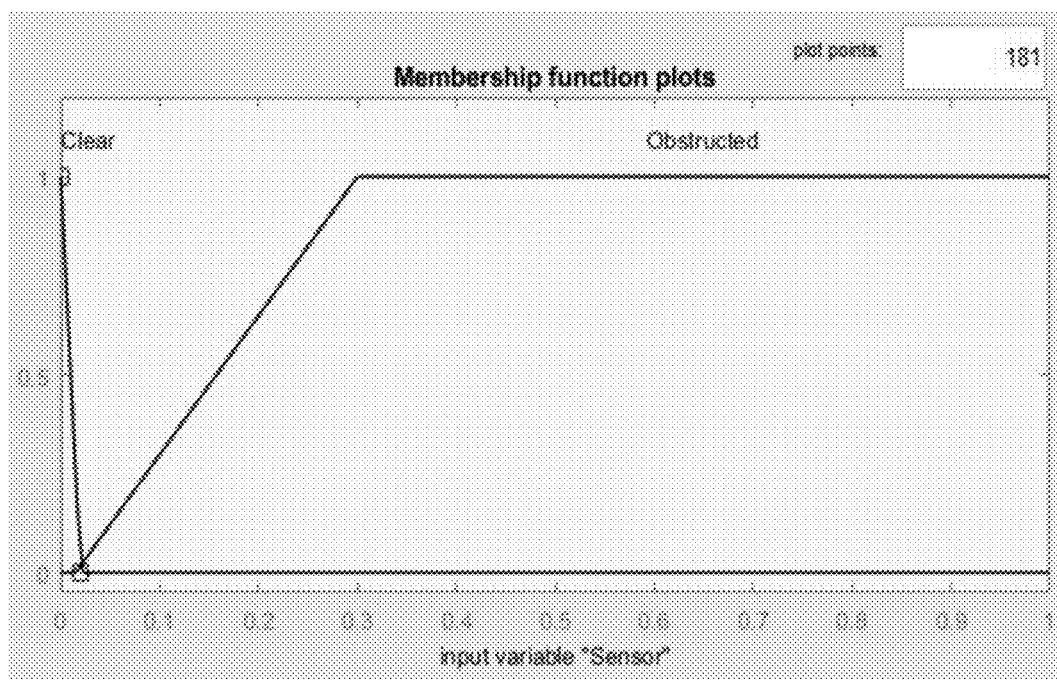
FIG. 15 is a plot of the sensor membership function according to an embodiment of the invention.

The sensor member represents the percent of LIDAR obstruction. The LIDAR scan has 360 data points, each with an angle and range. The check for obstruction is based on the size of the drone. For a UAV having a diameter of about 0.3 meters where the LIDAR is centered underneath, the obstruction distance may be set to 0.15 meters. Each range data point is compared to the obstruction distance. If a range data point is less than 0.15, then the angle is considered obstructed. The sensor member is calculated as the percentage of obstructed angles. The sensor member graph is shown in FIG. 15.

Figure 16:
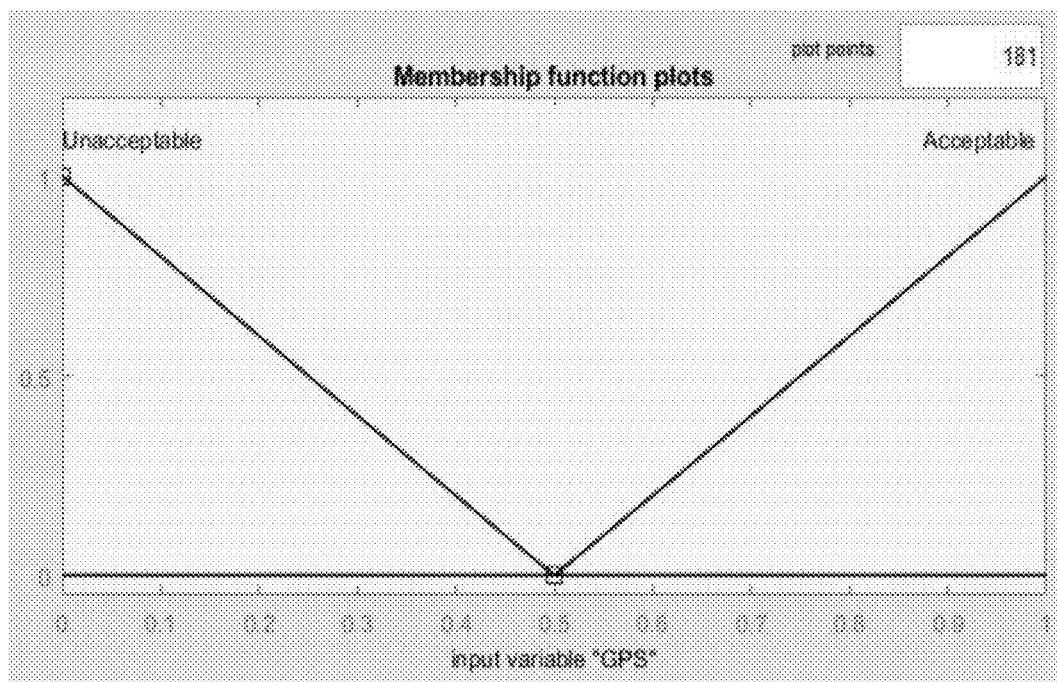
FIG. 16 is a plot of the GPS membership function according to an embodiment of the invention.

The GPS member represents the quality of the GPS signals. The GPS input is a binary value indicating whether or not the GPS signals have been lost or spoofed. A check for a lost GPS signal as well as spoofed GPS packets is performed to determine whether GPS is working or not. If the GPS location is spoofed to be more than a mile away from the last known UAV location, the GPS value is set to 0. If GPS signal is lost then, the value is also set to 0. A value of 1 for GPS is desired for the drone to be safe to fly. The GPS member graph is shown in FIG. 16.

Figure 17:
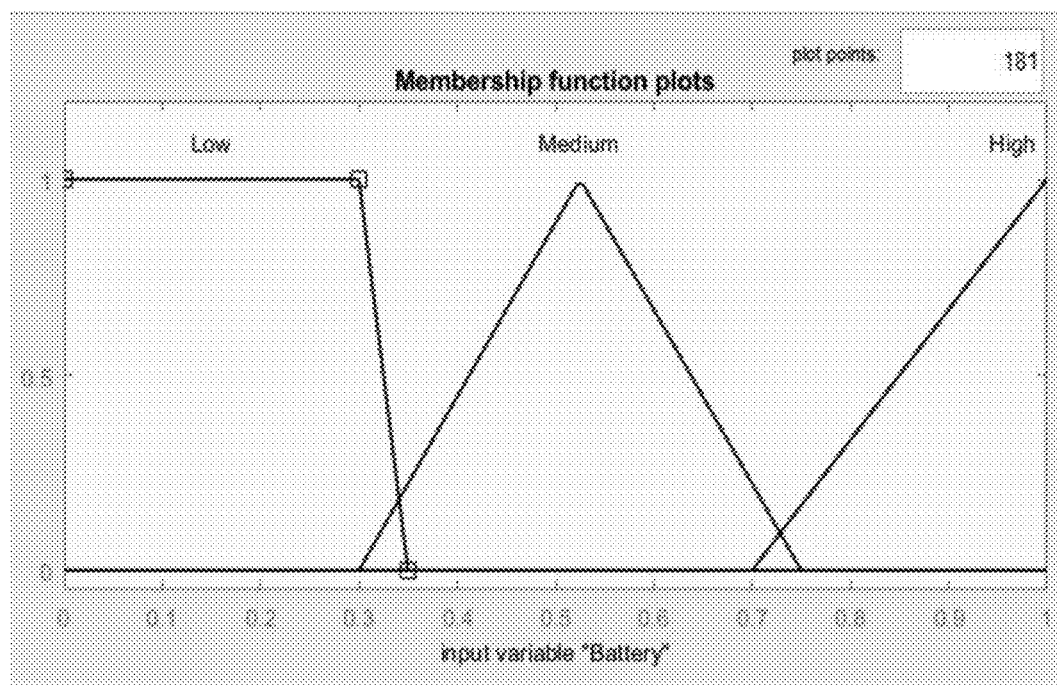
FIG. 17 is a plot of the battery membership function according to an embodiment of the invention.

The battery member is the UAV battery level. The membership is split into three sections: low, medium and high. The ranges are classified based on the behavior of the UAV due to the battery. A battery member graph is shown in FIG. 17.

Figure 18:
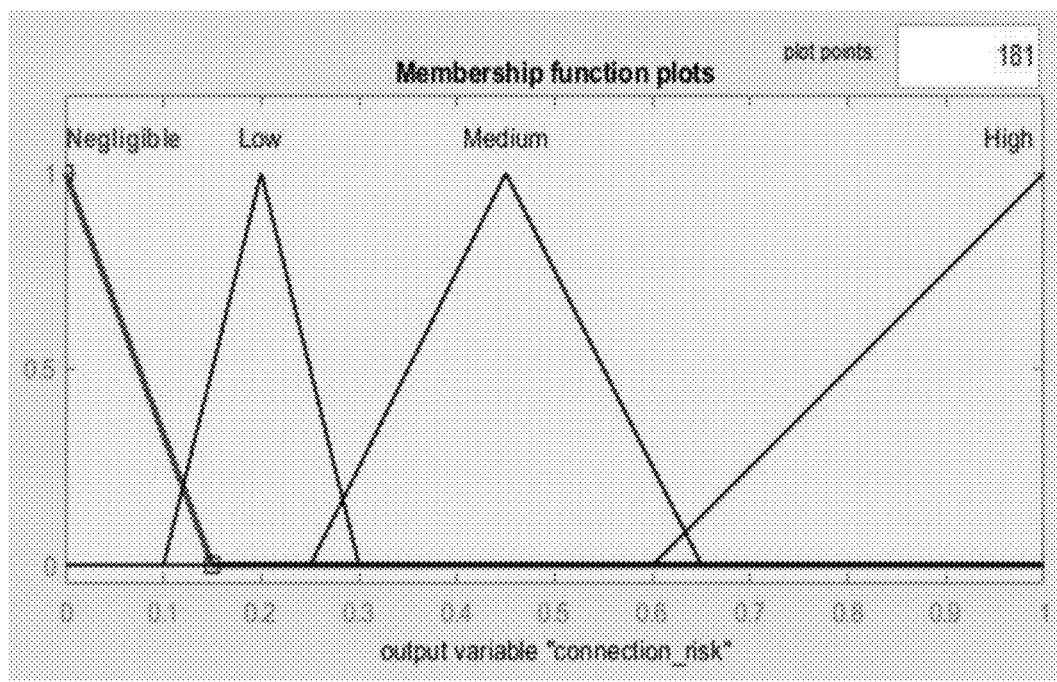
FIG. 18 is a plot of the connection risk membership function according to an embodiment of the invention.

The inputs for the security risk calculations having been discussed, the fuzzy security risk calculations will be explained. The first fuzzy security module calculates a connection risk score using the value inputs for router access, ports, services and link members (see Table 2). The connection risk is negligible if both ports and services are good. That means there are no unknown ports listen and no unauthorized services. The risk goes up to the medium range when one of ports or services is bad and the other is good. These rules hold true only when there are no rogue IPs on the network and the link between payload and ground station is good. If either router access or the link are unacceptable, then the output risk is high. All other combinations also result in high output risk. A connection risk membership graph is shown in FIG. 18.

Figure 19:
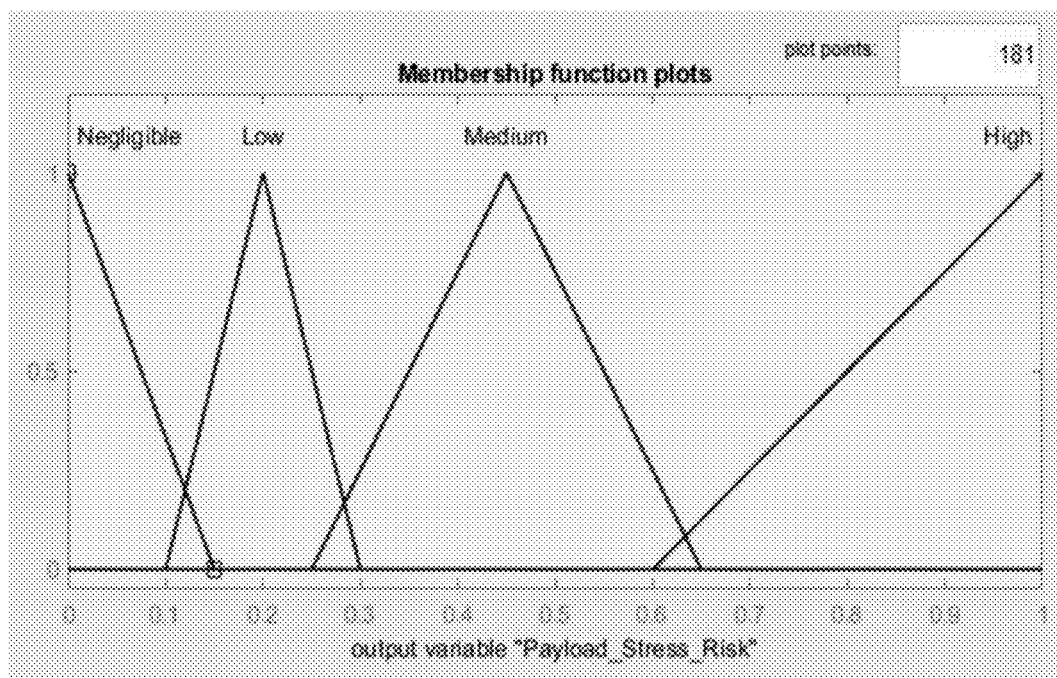
FIG. 19 is a plot of the payload stress risk membership function according to an embodiment of the invention.

The second fuzzy security system calculates a payload stress risk score using assigned value inputs for CPU, memory and processes members (see Table 2). The CPU, memory and processes payload stress inputs are percent changes from nominal values collected over time for the specific operating system used for the payload (this will vary for different systems). The CPU input is preferably bounded from 0 to 2 and any value is acceptable within that range because CPU usage varies from nominal values depending on acceptable background processes. The memory input is also preferably bounded from 0 to 2, but only a normal range (0.95 to 1.13 in the case of payload Linux system) keeps the payload stress risk within the negligible to low range. The processes input is preferably bounded from 0 to 3 since more variability in amount of running processes is acceptable. In order for the payload stress to remain in the negligible to low range, the processes have to be in the normal range (e.g., 0.4 to 2.1). The payload stress risk increases as memory usage or number of running processes increase or decrease from the normal range. The ranges for memory, processes and CPU are chosen based on 19,000 to 400,000 data points recorded during normal operation. The risk increases to the medium level if only one of the three parameters increases from the normal range. If more than one increases, then the risk goes to the high range. If CPU usage goes below the normal range, the risk remains low unless both the memory and processes are above the normal range. A payload stress risk membership graph is shown in FIG. 19.

Figure 20:
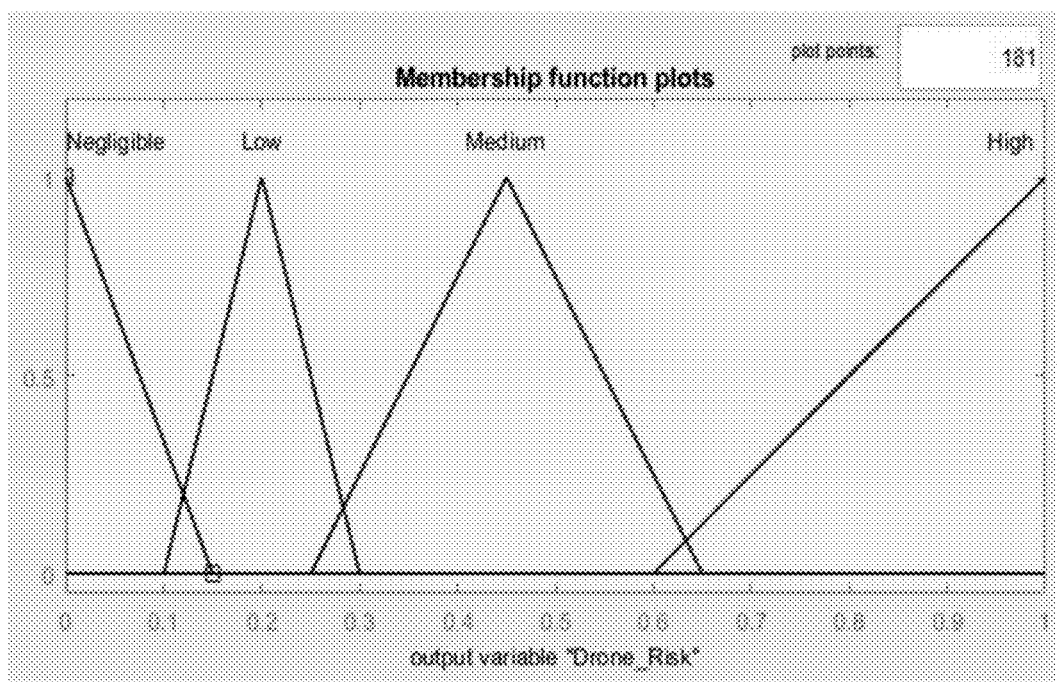
FIG. 20 is a plot of the drone risk membership function according to an embodiment of the invention.
Figure 21A:
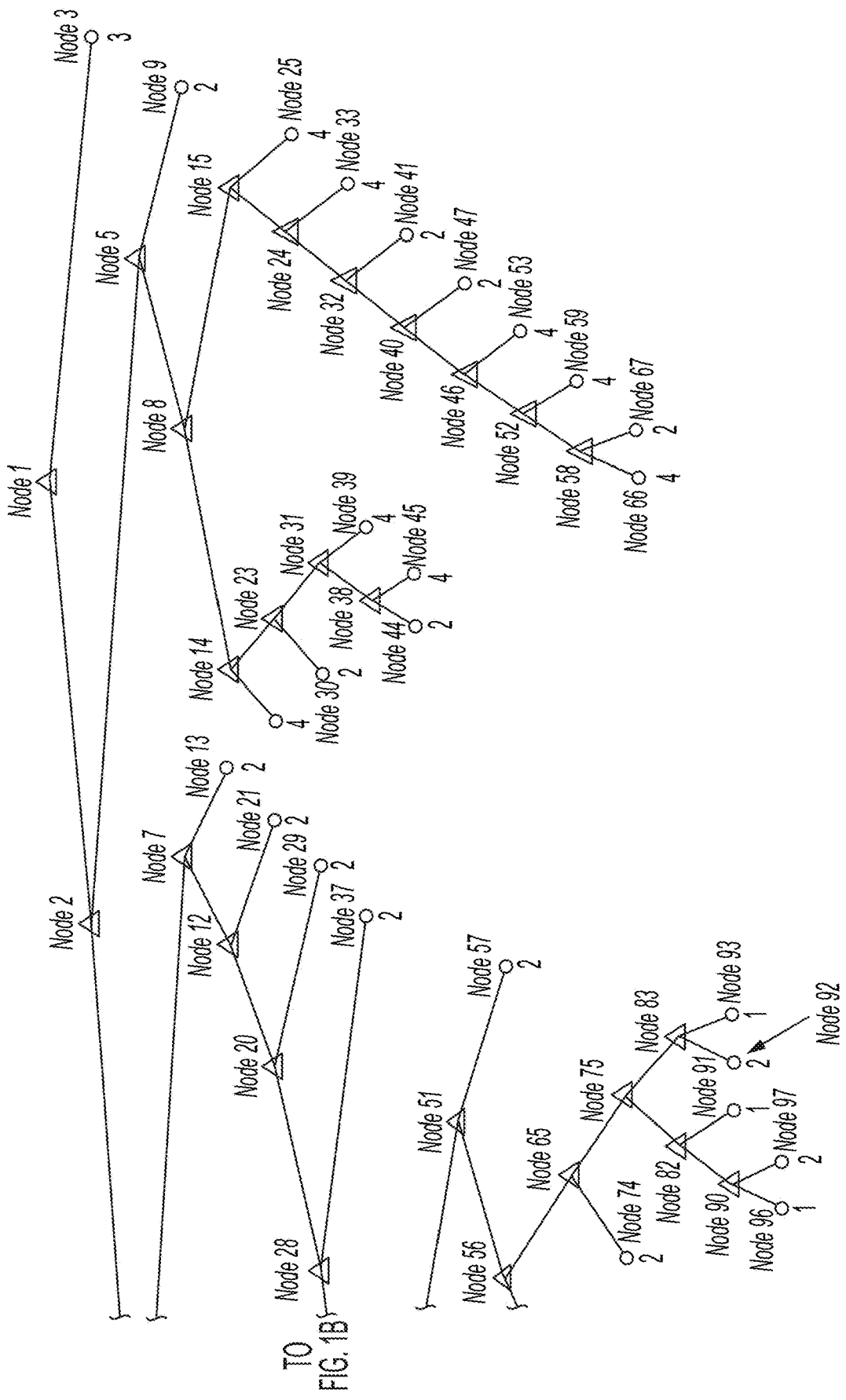
FIG. 21A is a graph of a flight contingency decision tree according to an embodiment of the invention.
Figure 21B:
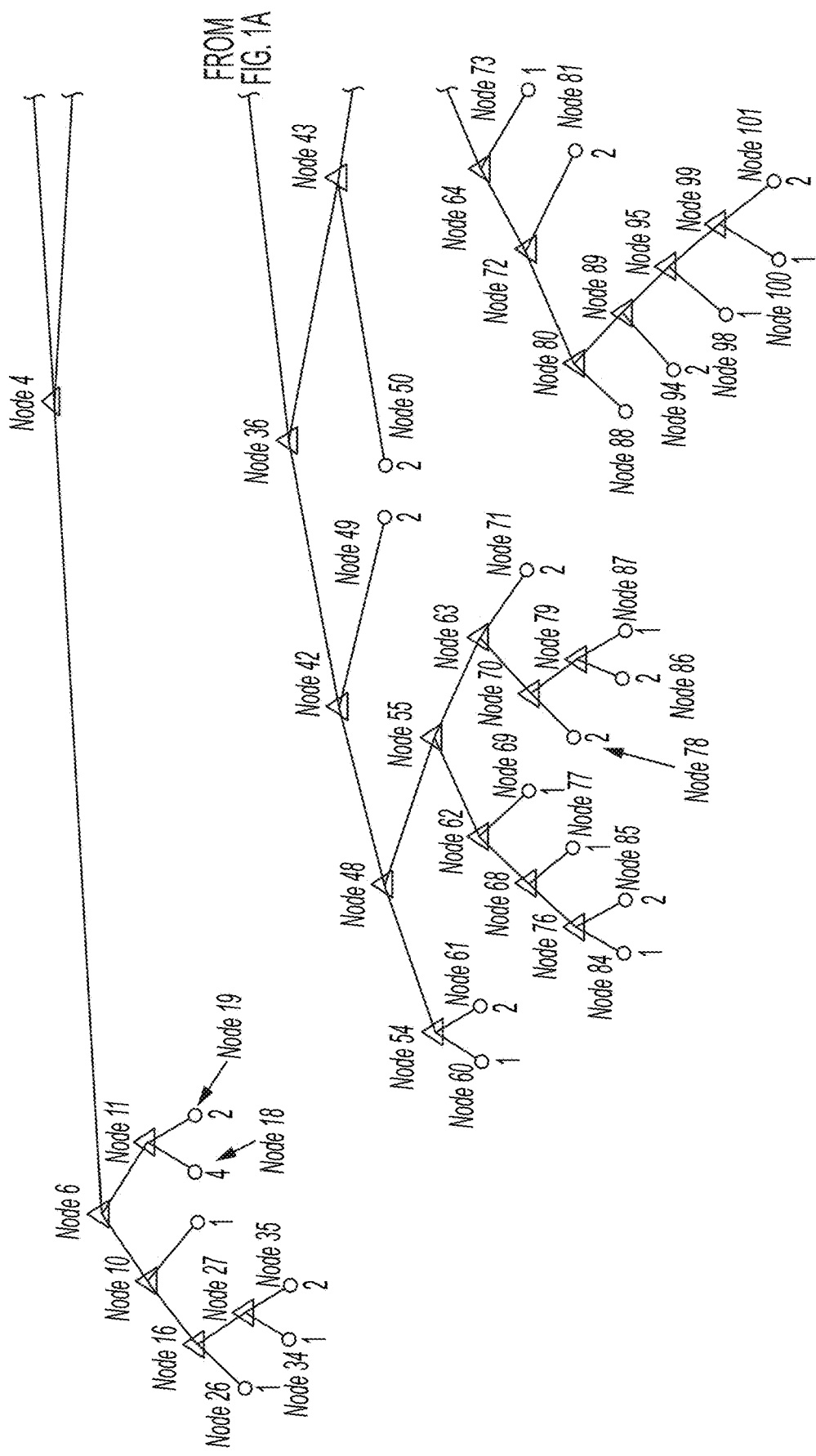
FIG. 21B is a continuation of FIG. 21A.

The third fuzzy security system calculates a drone risk score using value inputs for battery, GPS, sensor, file system and installed packages members (see Table 2). The sensor parameter is extremely sensitive. The drone risk system is tuned so 0.02 or 2 percent of the LIDARs 360 data points is the maximum acceptable obstruction while the risk is negligible. The 0.02 maximum is acceptable to account for the non-retractable legs of the drone that are picked up by the LIDAR. The GPS, file system and installed packages parameters scale up the risk one level for each category they decrease. This is to bring awareness that combinations of any of these should be concerning. The battery can be considered medium to high, or 0.3 to 1 without increasing the drone risk outside of the negligible range. The battery parameter scales the risk of all combinations up an extra level if low. Otherwise, the battery doesn't affect the risk. A drone risk membership graph is shown in FIG. 20.

Once the safety risk score and security risk scores (connection risk score, payload stress risk score and drone risk score) have been determined by the fuzzy safety and fuzzy security modules, respectively, they are sent to a decision tree, to determine a flight contingency, i.e., "continue mission", "hover in place", "land in place", and "return to home," and the flight contingency is sent to the navigation control system to confirm (in the case of a continue mission determination) or override the navigation instructions sent from the native navigation algorithm.

The flight contingency decision tree is preferably a cascade of if/then statements that are tuned to the user/operator's risk sensitivity. See, for example, FIGS. 21a-21b and 22a-22d, where X1 represents the safety risk score, X2 represents the connection risk score, X3 represents the payload stress risk score, X4 represents the drone risk score, and where classes 1-4 represent decision tree flight contingencies.

According to a first embodiment, the decision tree may be programmed to produce a "continue mission" contingency when the safety risk is negligible to medium (e.g., values 0 to 0.65); the connection risk is negligible to low ((e.g., 0 to 0.3); the payload stress risk is negligible to low (e.g., 0 to 0.3), and the drone stress risk is negligible (e.g., 0 to 0.15).

The decision tree may be programmed to produce the "hover in place" contingency, for example, when the safety risk is high (for example from 0.6 to 1), the connection risk is negligible to medium (e.g., 0 to 0.65), the payload stress risk is negligible to medium (e.g., 0 to 0.65), and the drone risk is negligible to low (e.g., 0 to 0.3).

The decision tree is preferably programmed to produce the "land in place" contingency when, the drone risk is high (e.g., 0.6 to 1) because the drone risk system represents potentially fatal anomalies. The connection risk should be negligible to medium (e.g., 0 to 0.65), as a proper connection is preferable for a UAV landing in an unexpected area. The safety risk can be anything from negligible to high (0 to 1) to consider landing in place, and the payload stress risk can be anything from negligible to high (0 to 1) because if the payload is under too much stress it could affect the sensors and cause the UAV to incorrectly perceive the environment And the decision tree may be programmed to produce a "return to home" contingency when the safety risk needs is negligible to medium (e.g., 0 to 0.65) so that the UAV will not collide as it moves toward home, the connection risk is high (e.g., 0.6 to 1) because connection issues, unknown listening ports and new services either indicate a compromised system or unfavorable airspace for the UAV, the payload stress risk is negligible to medium (e.g., 0 to 0.65), because if it is high then the UAV should land, and the drone risk is negligible to low (e.g., 0 to 0.3) because the UAV should not fly during potentially fatal anomalies.

Once the decision tree process is completed, the result of the decision tree process is sent to the navigation control system to confirm (in the case of a continue mission determination) or override the navigation instructions sent from the native navigation algorithm.

The invention claimed is:

1. A safety assurance system for an unmanned aerial vehicle (UAV) comprising:
   a. said UAV having battery, a UAV processor, a UAV non-transient computer memory, a UAV wireless transmitter, a UAV wireless receiver, and a sensor payload comprising a plurality of navigation sensors and a plurality of security sensors including a GPS and a LIDAR,
   b. ground station comprising a ground station wireless transmitter, a ground station wireless receiver, a ground station processor, and a ground station non-transient computer memory, and
   c. a flight controller comprising a flight controller wireless transmitter, a flight controller wireless receiver, a flight controller ground station processor, and a flight controller non-transient computer memory,
   d. said UAV non-transient computer memory containing computer readable instructions, which when executed by said UAV processor cause said UAV processor to:
      i. control said UAV based on navigation instructions received at said UAV wireless receiver from said flight controller wireless transmitter,
      ii. collect sensor data from said plurality of navigation sensors and said plurality of security sensors to collect sensor data,
      iii. transmit said sensor data via said UAV wireless transmitter to said ground station wireless receiver,
   e. said ground station processor and ground station non-transient computer memory configured to:
      i. control navigation of said UAV;
      ii. use fuzzy logic rules to calculate a safety risk score based on direction of travel of said UAV and proximity sensor inputs,
      iii. use fuzzy logic rules to calculate a connection risk score using router access, ports, services, and link inputs,
      iv. use fuzzy logic rules to calculate a payload stress risk score using CPU, memory and processes inputs,
      v. use fuzzy logic rules to calculate a drone risk score using battery, GPS, sensor, file system, and installed packages inputs,
      vi. use a decision tree to calculate a navigation contingency based on said safety risk score, said connection risk score, said payload stress risk score, and said drone risk score, wherein said navigation contingency is selected from a group consisting of continue mission, hover in place, land in place, or return to home, and
      vii. confirm or override UAV control commands based on said decision tree calculation.

2. A computer implemented method for improving safety of an unmanned aerial vehicle (UAV),
   using a UAV onboard computer including processor and memory, to collect and store, CPU, memory processes, router access, ports, services, link, battery, file system, and installed packages data from said UAV onboard computer,
   using said UAV onboard computer to collect and store GPS data from an onboard GPS and proximity data from on onboard LIDAR,
   transmitting to a ground station said CPU, memory processes, router access, ports, services, link, battery, file system, and installed packages data, said GPS data and said proximity data,
   using fuzzy logic rules to assign values to said CPU, memory processes, router access, ports, services, link, battery, file system, and installed packages data, said GPS data and said proximity data,
   using fuzzy logic rules to generate a safety risk score based on a direction of travel of said UAV and a proximity data value,
   using fuzzy logic rules to generate a connection risk score from values assigned to said router access, ports, services and link data,
   using fuzzy logic rules to generate a payload stress risk score from values assigned to said CPU, memory and processes data,
   using fuzzy logic rules to generate a drone risk score from values assigned to said battery, GPS, sensor, file system and installed packages data,
   using a decision tree to arrive at one of a continue mission determination, a hover in place determination, a land in place determination and a return to home determination, and
   confirming or overriding UAV control commands based on said decision tree determination.

* * * * *